United States Patent
Wilson et al.

(10) Patent No.: US 7,295,188 B1
(45) Date of Patent: Nov. 13, 2007

(54) MODIFIED COMPUTER KEYBOARD NUMBER PAD

(76) Inventors: Wayne M. Wilson, 3613 S. 119th E. Ave., Tulsa, OK (US) 74146; Rodney S. Twyman, 11608 E. 36th St., Tulsa, OK (US) 74146

( * ) Notice: Subject to any disclaimer, the term of this patent is extended or adjusted under 35 U.S.C. 154(b) by 541 days.

(21) Appl. No.: 10/899,351

(22) Filed: Jul. 26, 2004

Related U.S. Application Data

(60) Provisional application No. 60/558,931, filed on Apr. 2, 2004.

(51) Int. Cl.
*G09G 5/00* (2006.01)

(52) U.S. Cl. ............ 345/168; 345/156; 345/169; 345/172; 341/22; 341/26; 341/28

(58) Field of Classification Search ........ 345/168–172, 345/156, 157
See application file for complete search history.

(56) References Cited

U.S. PATENT DOCUMENTS

| | | | | |
|---|---|---|---|---|
| 4,698,618 A | * | 10/1987 | Liuzzo et al. | 379/267 |
| 5,600,313 A | * | 2/1997 | Freedman | 341/22 |
| 6,883,984 B2 | | 4/2005 | McLoone | |
| 6,910,818 B2 | * | 6/2005 | McLoone et al. | 400/477 |
| 6,965,372 B1 | * | 11/2005 | Woods | 345/168 |
| 2005/0073445 A1 | | 4/2005 | Barlow | |

* cited by examiner

*Primary Examiner*—Richard Hjerpe
*Assistant Examiner*—Jennifer T Nguyen

(57) ABSTRACT

The present invention provides for a number pad section of a keyboard having a plurality of digit keys, a plurality of arithmetic operation keys, and a Tab key operational by the ring or little finger of the operator's hand.

3 Claims, 4 Drawing Sheets

MODIFIED COMPUTER KEYBOARD NUMBER PAD

REFERENCE TO PENDING APPLICATIONS

This application claims priority from U.S. Provisional Patent Application Ser. No. 60/558,931 filed on Apr. 2, 2004 entitled MODIFIED COMPUTER KEYBOARD.

REFERENCE TO MICROFICHE APPENDIX

This application is not referenced in any microfiche appendix.

BACKGROUND OF THE INVENTION

1. Field of the Invention

The present invention relates generally toward entering data into a computer system or a similar device, more specifically the present invention directed toward a keyboard having a modified number pad.

2. Background

The standard configuration for keyboards includes an alphanumeric section, function section, editing section and a number pad section. The alphanumeric section includes keys for each of the letters, digits from 0 to 9, punctuation keys and the tab key. The tab key is typically located along the upper left hand side of this section. The left hand pinky finger is usually used to activate this key. The function section is typically located above the alphanumeric section and includes a series of function keys. An editing section typically located to the right of the alpha numeric section includes arrow keys and other types of editing keys, which include the insert and delete keys.

The number pad section typically located to the right of the editing section. Includes keys from the 0 to 9 digits along with the various arithmetic keys including the divide, multiply, subtract and plus keys along with a enter key. A number lock key is typically included in this section in the upper left most corner. The arithmetic keys are typically located above and to the right of the 9 digit keys.

The standard keyboard configuration disadvantage is that the tab key is not included in the numeric section even though the tab key is frequently used in data entry. In an effort to resolve this disadvantage is set forth a U.S. Patent Application 20020159811 published on Oct. 31, 2002, which includes a tab key in place of the number lock key in the numeric section of the keyboard. This attempt however, while resolving this issue of providing a tab key in the numeric section creates an unbalanced and in efficient placement of ones hand in order to activate the tab key. There is a need for an improved keyboard that attempts to provide a more efficient numeric section to the keyboard.

BRIEF SUMMARY OF THE INVENTION

The present invention satisfies the needs discussed above. The present invention is generally directed toward a keyboard. More specifically, the present invention is directed toward a keyboard having a modified numeric section, which has an additional tab key.

One aspect of the present invention includes having a number pad section of a keyboard having a tab key contained therein. The tab key is located to the right of the established keys of the typical number pad section, more particularly, to the right of the enter key and the arithmetic keys.

Another aspect of the present invention is directed toward a keyboard having a modified number pad section having a tab key and an escape key located to the right side of the enter key and the arithmetic keys. By having the addition of the escape key, an incorrectly entered number can be erased with this escape key with one key stroke with the right hand finger.

By positioning the tab key outside of the standard number pad, the user is able to enter the numbers without breaking the rhythm of said entry and by not using the left hand for tabbing allows the left hand to be dedicated to handling documents or other papers that data is being entered from. This is shown by the ability to leave fingers over the digit keys utilizing the lowest ring or pinky finger to activate the tab key. By placing the tab key in another position in the numeric section requires the user to lift the fingers away from the digit keys causing delay and accuracy in entry.

Upon reading the above description, various alternative embodiments will become obvious to those skilled in the art. These embodiments are to be considered within the scope and spirit of the subject invention, which is only to be limited by the claims which follow and their equivalents.

DETAILED DESCRIPTION OF THE PREFERRED EMBODIMENTS

The attached drawing demonstrates an embodiment of the present invention. It is to be understood that the invention is not limited in its application to the details of the construction and arrangement of parts illustrated in the accompanying drawings. The invention is capable of other embodiments and of being practiced or carried out in a variety of ways. It is to be understood that the phraseology and terminology employed herein are for the purpose of description and not of limitation.

Figure 1:
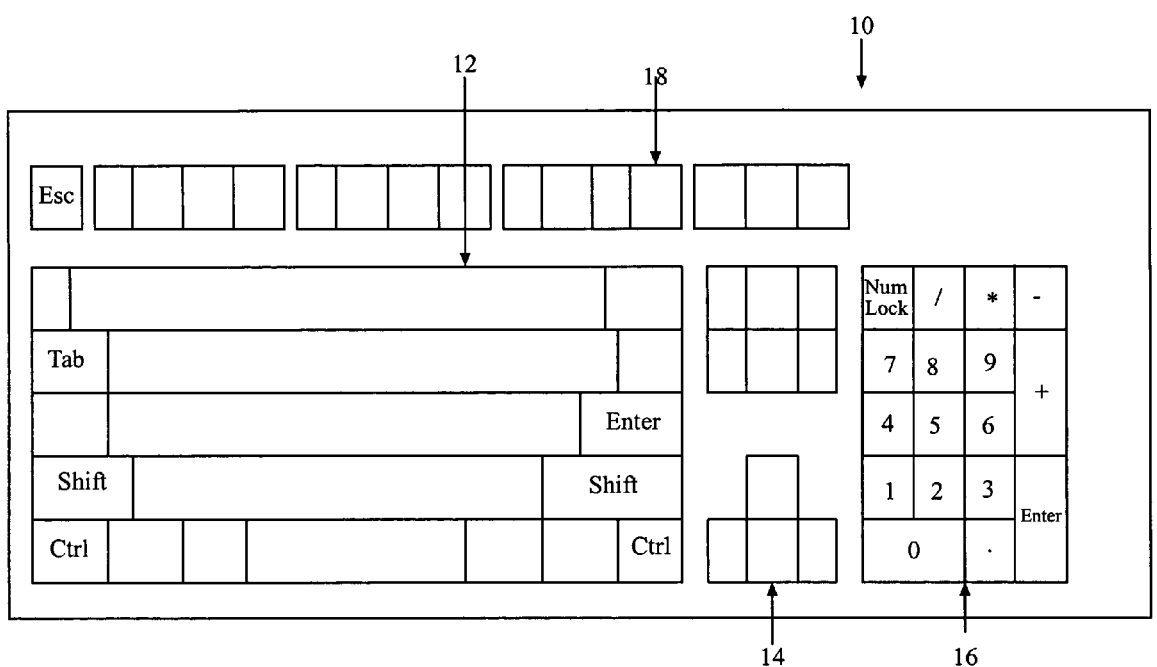
FIG. 1 is a prospective view of a prior art keyboard

The general layout for most computer keyboards is shown in FIG. 1. A standard keyboard 10 layout includes an alphanumeric section 12, an editing section 14, a number pad section 16, and a function section 18. The alphanumeric section 12, sometimes referred to as the "QWERTY" section, typically includes keys for each of the letters of the alphabet, the digits 0-9, and various punctuation symbols. The editing section 14, located to the right of the alphanumeric section 12, typically includes four arrow keys for controlling the cursor, and Insert, Delete, Home, End, PageUp, and PageDown keys. The number pad section 16 is located to the right of the editing section 14, typically includes keys for each of the digits 0-9 and arithmetic operation symbol keys. The function section 18 includes function keys.

Figure 2:
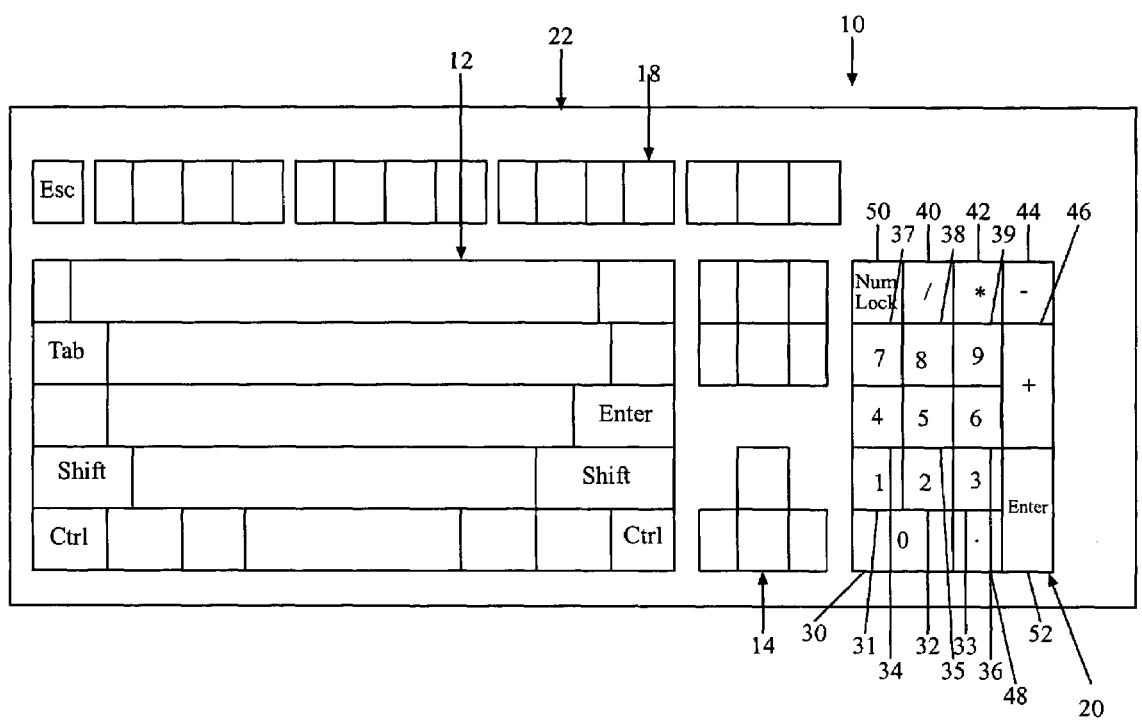
FIG. 2 is a second prospective view the prior art keyboard in FIG. 1

A conventional key configuration for a number pad section 20 is shown on a keyboard 22 in FIG. 2. The number pad section 20 includes Digit 0-9 keys, respectively designated by reference numerals 30-39, arithmetic operation keys including a Divide "/" key 40, a Multiply "*" key 42, a Subtract "−" key 44, and an Addition "+" key 46, a Decimal Separator key 48, a NumLock key, 50, and an Enter key 52. The Digit 1-9 keys 31-39 are organized in a three-by-three array. The Digit 0 key 30 and the Decimal Separator key 48 are disposed below that array. The arithmetic operation keys 40-46 are disposed above and to the right of the array of the Digit 1-9 keys 31-39. The NumLock key 50 is positioned in the upper left corner of the number pad section 20 above the Digit 7 key 37. The Enter key 52 is positioned in the bottom right corner of the numeric section 20 to the right of the Decimal Separator key 48 and the Digit 3 key 33. A common variation to this configuration includes switching the Digit 1, Digit 2 and Digit 3 keys 31-33 with the Digit 7, Digit 8, and Digit 9 keys 37-39 so that the Digit keys 31-39 resemble a telephone key number system rather than a calculator key number system.

The number pad section 20 on the keyboard 22 is typically utilized in many different types of applications where the data entry of numbers is a frequent occurrence. Some examples of such applications include accounting programs, tax programs, spreadsheets, databases, and e-commerce programs on websites.

Figure 3:
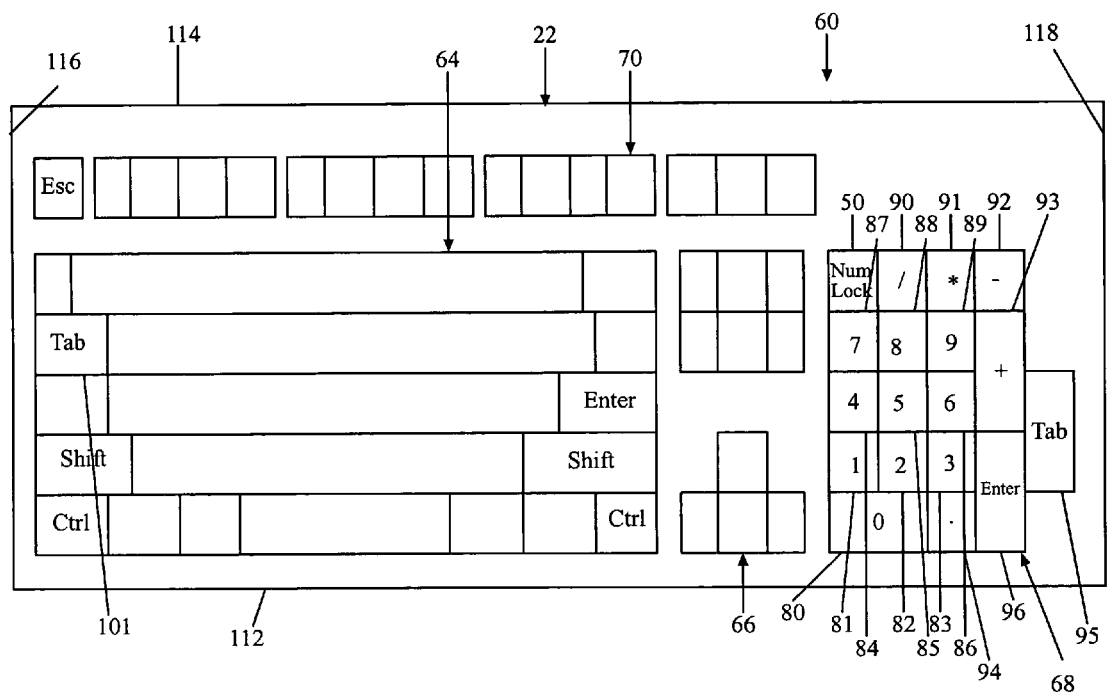
FIG. 3 is a prospective view of an embodiment of the present invention.
Figure 4:
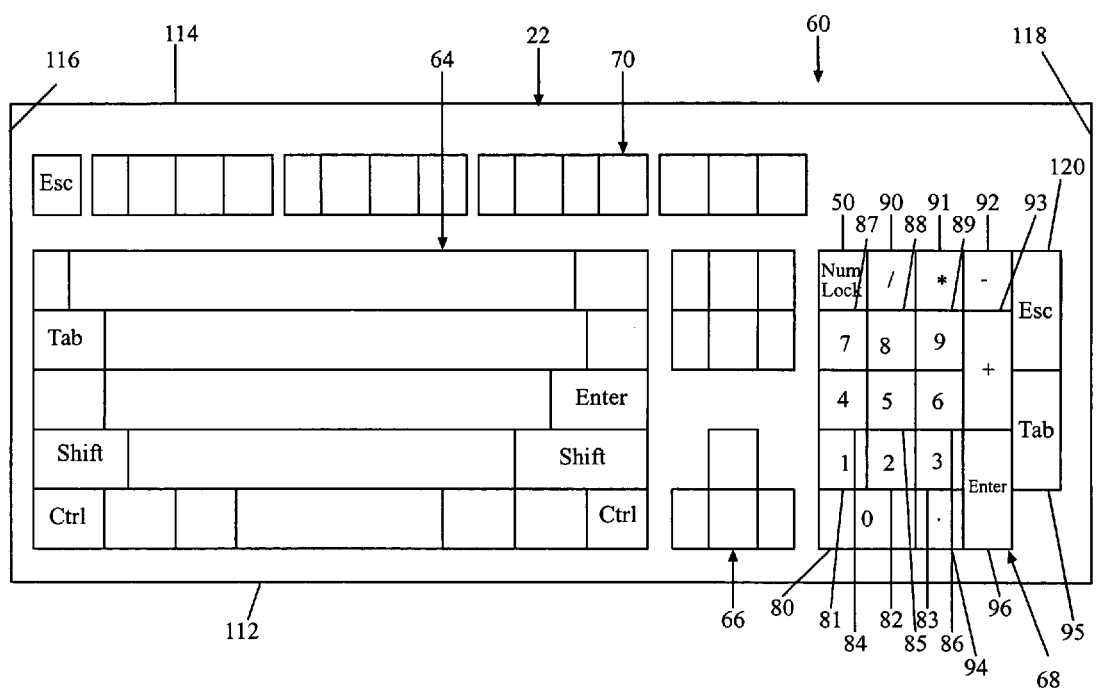
FIG. 4 is a prospective view of a second embodiment of the present invention.

Exemplary keyboard designs in accordance with one or more aspects of the present invention are shown in FIGS. 3-4 and designated by reference numeral 60. Referring to FIG. 3, the keyboard 60 includes an alphanumeric section 64, an editing section 66, a number pad section 68, and a function section 70. For reference purposes, the keyboard 60 has a front edge 112 adjacent the user during normal use, a back edge 114 distal from the user during normal use, a left edge 116 to the left side of the user during normal use and a right edge 118 to the right side of the user during normal use.

The alphanumeric section 64, sometimes referred to as the QWERTY section, includes keys for each of the letters of the alphabet, each of the digits 0-9, and various punctuation symbols. The editing section 66, preferably located immediately to the right of the alphanumeric section 64, preferably includes four cursor control arrow keys 80, and Delete, Home, End, PageUp, and PageDown keys 82. The number pad section 68, is preferably to the right of the editing section 66. The function section 70 preferably includes a horizontal row of keys above the alphanumeric section 64, editing section 66, and number pad section 68. In a preferred arrangement, thirteen function keys are located above the alphanumeric section 64 and preferably grouped and labeled for their function as shown.

The number pad section 68 includes Digit 0-9 keys 80-89; arithmetic operation keys 90-93 including a Divide "/" key 90, a Multiply "*" key 91, a Subtract "−" key 92, and an Addition "+" key 93; a Decimal Separator key 94; a Tab key, 95; and/or an Enter key 96. The Digit 1-9 keys 80-89, are organized in a three-by-three array. Digit 0 key 80 and the Decimal Separator key 94 are disposed below that array. The arithmetic operation keys 90-93 are disposed above and to the right of the array of digit keys, 61-69. The Enter key 96 is positioned in the bottom right corner of the number pad section 68 to the right of the Decimal Separator key 94 and the Digit 3 key 83. The Tab key 95 is positioned to the right of the a Subtract "−" key 92, and an Addition "+" key 93 and the Enter key 96.

By having the Tab key 95 located to the right of the a Subtract "−" key 92, and an Addition "+" key 93; and/or an Enter key 96 various drawbacks of conventional keyboards are eliminated. Such drawbacks include having to use a mouse to switch cells or fields, or the need to awkwardly and inefficiently locate and depress the Tab key 101 on the QWERTY or alphanumeric section 64. Accordingly, in use, the user can activate all of the digit keys 80-89, the arithmetic operation keys 90-93, the Tab key 95, and the other keys 94 and 96 in the number pad section 68 efficiently with one hand.

As shown in FIG. 4, another embodiment of the present invention includes adding an "Escape" key 120 to the keyboard 60. "Escape" key 120 is placed just above Tab key 95 and is also to the right of the a Subtract "−" key 92, and an Addition "+" key 93 and the Enter key 96. This allows the user to also have the functionality of the "Escape" key available for use with one hand. This allows an incorrectly entered number to be erased with one keystroke with the right hand fingers.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification.

The invention claimed is:

1. A computer keyboard number pad section on the right side of a computer keyboard comprising:
    (a) a plurality of digit keys
    (b) a plurality of arithmetic operation keys, and
    (c) a Tab key on the right side of the number pad operational by the ring finger or little finger of the operator's right hand,
    (d) wherein all numeric data at a more productive rate without removing right hand from the data entry position.

2. The number pad section of claim 1 further comprising an Escape Key located directly above said Tab key being operational by the ring or little finger of the operator's hand.

3. The number pad section of claim 1 wherein said Tab key is located approximately in line with the row of keys 1, 2, and 3 of the number pad.

* * * * *